United States Patent [19]

Aufdermarsh, Jr.

[11] 4,413,094
[45] Nov. 1, 1983

[54] PERFLUOROELASTOMER BLENDS

[75] Inventor: Carl A. Aufdermarsh, Jr., Newark, Del.

[73] Assignee: E. I. Du Pont de Nemours & Co., Wilmington, Del.

[21] Appl. No.: 427,412

[22] Filed: Sep. 29, 1982

[51] Int. Cl.$^3$ .................. C08L 27/18; C08L 71/00
[52] U.S. Cl. .................................... 525/187; 525/186; 525/200
[58] Field of Search .................. 525/186, 187, 200

[56] References Cited

U.S. PATENT DOCUMENTS

| | | | |
|---|---|---|---|
| 3,019,206 | 1/1962 | Robb | 260/29.6 |
| 3,030,260 | 4/1962 | Metzler et al. | 156/305 |
| 3,051,683 | 8/1962 | Mallouk | 260/45.5 |
| 3,105,827 | 10/1963 | Kaufman | 260/45.5 |
| 3,291,864 | 12/1966 | Eldridge et al. | 260/900 |
| 3,400,065 | 9/1968 | Barth | 204/159.2 |
| 3,467,638 | 9/1969 | Pattison | 260/87.5 |
| 3,484,503 | 12/1969 | Magner et al. | 260/900 |
| 3,531,432 | 9/1970 | Graver | 260/41 |
| 3,546,186 | 12/1970 | Gladding et al. | 260/80.73 |
| 3,682,872 | 8/1972 | Brizzolara et al. | 260/80.76 |
| 3,723,577 | 3/1973 | Stivers | 260/900 |
| 3,769,371 | 10/1973 | Nersasian | 260/900 |
| 3,851,018 | 11/1974 | Kelly | 260/900 |
| 3,987,126 | 10/1976 | Brodoway | 260/884 |
| 4,094,949 | 6/1978 | Yokokawa et al. | 264/234 |
| 4,115,481 | 9/1978 | Finlay et al. | 260/900 |
| 4,128,693 | 12/1978 | Dhami et al. | 428/379 |
| 4,200,568 | 4/1980 | Trautvetter et al. | 260/42.47 |
| 4,281,092 | 7/1981 | Breazeale | 526/247 |
| 4,356,291 | 10/1982 | Darling | 525/403 |
| 4,360,645 | 11/1982 | King et al. | |

Primary Examiner—Carman J. Seccuro

[57] ABSTRACT

Co-vulcanizable fluoroelastomer blends of tetrafluoroethylene/perfluoro-(methylvinyl-ether)/cure-site monomer terpolymer and hexafluoropropylene oxide/cure-site monomer dipolymer.

8 Claims, No Drawings

PERFLUOROELASTOMER BLENDS

DESCRIPTION

1. Technical Field

This invention relates to certain vulcanizable fluoroelastomer compositions, which compositions are based upon co-vulcanizable blends of a major proportion of a tetrafluoroethylene/perfluoro-(methylvinyl ether)/cure-site monomer terpolymer and a minor proportion of a high molecular weight hexafluoropropylene oxide (HFPO)/cure-site monomer dipolymer. Such blends are vulcanizable to useful elastomeric materials characterized by excellent physical properties and resistance to environmental attack. These materials can be fabricated into mechanical parts such as O-rings, flange seals, gasket stock, pump diaphragms and liners and are particularly useful where extraordinary resistance to heat and corrosive fluids is required. In addition, low temperature properties are improved. This invention also relates to improvements in the rheological and processing characteristics of the tetrafluoroethylene/perfluoro-(methylvinyl ether)/cure-site monomer terpolymer by blending therewith a minor proportion of a co-vulcanizable, high molecular weight, hexafluoropropylene oxide/cure-site monomer dipolymer.

2. Background Art

U.S. Pat. No. 3,546,186 granted Dec. 8, 1970 to Gladding and Sullivan, discloses certain vulcanizable terpolymers derived from tetrafluoroethylene, perfluoro-(methylvinyl ether) and a cure-site monomer which can be, among other things, perfluoro (4-cyanobutyl vinyl ether) or perfluoro (4-carbomethoxybutyl vinyl ether).

U.S. Pat. No. 3,467,638 granted Sept. 16, 1969 to Pattison, discloses certain vulcanizable terpolymers derived from tetrafluoroethylene, perfluoro-(methylvinyl ether) and a cure-site monomer which can be, among other things, perfluoro (2-phenoxypropyl vinyl ether).

U.S. Pat. No. 3,682,872 granted Aug. 8, 1972 to Brizzolara and Quarles, discloses certain vulcanizable terpolymers derived from tetrafluoroethylene, perfluoro-(methylvinyl ether), and as a cure-site monomer, perfluoro (3-phenoxypropyl vinyl ether).

U.S. Pat. No. 4,281,092 granted July 28, 1981 to Breazeale, discloses certain vulcanizable copolymers of tetrafluoroethylene, perfluoro-(methylvinyl ether), and a cure-site monomer which can be perfluoro (8-cyano-5-methyl-3,6-dioxa-1-octene).

All of the above are examples of terpolymers which can be used as the major proportion of the blends of the present invention.

Copending U.S. patent application Ser. No. 250,906, filed Apr. 3, 1981 by King and Krespan, now U.S. Pat. No. 4,360,645 discloses certain copolymers including hexafluoropropylene oxide/cure-site monomer dipolymers, where the cure-site monomer can be a perfluoroglycidyl ether of the formula

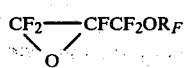

wherein $R_F$ is:

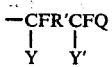

wherein

R' is a carbon-carbon bond or a linear or branched perfluoroalkylene group of 1 to 12 carbon atoms; Q is —CN, or —OC$_6$F$_5$; and Y and Y' are —F or —CF$_3$, or
(ii) —CF(R$^2$)$_2$ wherein R$^2$ is —CF$_2$CN; or

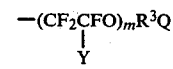

wherein R$^3$ is a linear or branched perfluoroalkylene group of carbon content such that the moiety

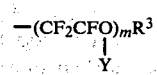

does not exceed 15 carbon atoms; Y independently is —F or CF$_3$; M is 1 to 4; and Q is as defined above; or
(iv) —C$_6$F$_5$.

High molecular weight dipolymers of hexafluoropropylene oxide and a cure-site monomer as disclosed in the above-mentioned U.S. Ser. No. 250,906 can be prepared according to the technique disclosed in copending U.S. patent application Ser. No. 250,905, filed Apr. 3, 1981 by Darling, now U.S. Pat. No. 4,356,291. That application discloses a process for purifying hexafluoropropylene oxide, which process permits the achievement of high degrees of polymerization (200 or more).

The dipolymers described above are examples of hexafluoropropylene oxide/cure-site monomer dipolymers which can be use as the minor proportion of the blends of the present invention.

DISCLOSURE OF THE INVENTION

The present invention relates to fluoroelastomer compositions comprising co-vulcanizable blends of at least one terpolymer and at least one dipolymer; the at least one terpolymer should comprise from 50 to 95 percent by weight of the fluoroelastomer blend and will be a tetrafluoroethylene/perfluoro-(methylvinyl ether)/cure-site monomer terpolymer where the cure-site monomer will have a functional moiety selected from the group consisting of —CN and —C$_6$F$_5$. Preferably the terpolymer will have an inherent viscosity of at least 0.4. Examples of suitable cure-site monomers are disclosed in U.S. Pat. Nos. 3,546,186; 3,467,638; 3,682,872; and 4,281,092, cited and discussed above.

The dipolymer should comprise from 5 to 50 percent by weight of the fluoroelastomer blend and will be high molecular weight (number average molecular weight of at least 15,000 or degree of polymerization of at least 90) hexafluoropropylene oxide/cure-site monomer dipolymer having an average cure-site monomer concentration of 2 per polymer chain where the cure-site monomer has the same functional moiety as in the terpolymer. It is important that the reactive functional group on the cure-site monomer be the same in the terpolymer and the dipolymer so that the blend is co-vulcanizable and so that the cure rate of each of the blend components are approximately equal. Otherwise the dipolymer has a tendency to separate from the vulcanizate, the separation becoming manifest by the presence of an oily exudate on the surface of the finished part. Failure to achieve co-vulcanization results in a product with inferior physical properties as well as undesirable surface characteristics.

Preferably the blends will contain about 65–80 weight percent of the terpolymer and 20–35 weight percent of the dipolymer. Preferably the dipolymer will be high molecular weight, i.e., at least 20,000 or having a degree of polymerization of at least 120.

Compounding, curing and moulding of the fluoroelastomer blends of the present invention will be done as would be done for the terpolymer alone, and as disclosed in U.S. Pat. No. 4,281,092.

Blending of the dipolymer with the terpolymer can be conveniently done, during compounding of the terpolymer, and will conveniently be accomplished by mixing on a 2-roll rubber mill for about 60 minutes at a temperature of about 65° C. Preferably, the dipolymer is predispersed on the filler (e.g. carbon black) by rolling in a jar for an extended period (e.g. overnight). The dispersed dipolymer is then more easily incorporated into and blended with the terpolymer than would be the case without predispersion on filler.

In the following examples, there are shown specific embodiments of the present invention in direct side-by-side comparison with embodiments of control experiments where, for example, the blends are not co-vulcanizable or there is no blend at all. It will be seen that the blends of the present invention do not exude dipolymer to the surface, have lower hardness, Tg and Clash Berg temperature values and/or superior tensile and set properties.

The polymers are as defined in the Tables I and II and were prepared generally as described in U.S. Pat. No. 4,281,092 and U.S. patent applications Ser. Nos. 250,905 and 250,906, as appropriate.

More specifically, polymer A in Table I was prepared by polymerization in a 3800 ml mechanically agitated, water-jacketed, stainless steel autoclave operated continuously at a temperature of 70° C. and a pressure of 4.8 MPa. Tetrafluoroethylene and perfluoro-(methylvinyl ether) were pumped in at the rate of 220 and 300 g/hr respectively, by means of a diaphragm compressor. Perfluoro-(8-cyano-5-methyl-3,6-dioxa-1-octene) was fed neat at the rate of 15.8 g/hr (41 mmole/hour). Each of two aqueous redox initiator solutions were pumped in separately at the rate of 600 ml/hr. The peroxide initiator solution A was prepared by dissolving 125 g ammonium persulfate, 80 g disodium phosphate heptahydrate and 200 g ammonium perfluorooctanoate in 8 liters de-aerated distilled water. Initiator solution B was prepared by dissolving 103 g sodium sulfite in 8 l de-aerated distilled water.

Polymer latex was removed continuously through a let-down valve and unreacted monomers were vented. Over a period of 9.5 hours 45 liters latex was collected.

Latex was coagulated by adding it to a solution consisting of 382 g magnesium chloride hexahydrate in 8.5 liters water, 8.5 liters ethanol, and 10 ml dilute sulfuric acid. The coagulated polymer was washed and isolated in the three-tank cascade process described in U.S. Pat. No. 3,752,789. The wet crumb was dried by heating in air at 75° C. for eight hours, then for two days at 125° C. in a vacuum oven. The yield of terpolymer was 3.7 kg. It contained about 34 mole % perfluoro-(methylvinyl ether), about 0.8 mole % perfluoro-(8-cyano-5-methyl-3,6-dioxa-1-octene), and had an inherent viscosity of 0.70 dl/g (measured in a solution containing 0.1 gram of polymer per 100 grams of solvent consisting of a 60/40/3 volume ratio of hepta-fluoro-2,2,3-trichlorobutane, perfluoro-(butyltetrahydrofuran) and diethylene glycol dimethyl ether.

Polymer B in Table I was prepared by the same procedure as was used to prepare polymer A except that perfluoro-(2-phenoxypropyl vinyl ether) was used in place of perfluoro-(8-cyano-5-methyl-3,6-dioxa-1-octene).

Polymer C in Table II was prepared by copolymerization of perfluoro-(6,7-epoxy-4-oxaheptanenitrile) with hexafluoropropylene oxide. The nitrile was prepared in a 100-ml stainless steel-lined tube charged with perfluoro-(4-oxa-6-heptanenitrile) which was heated at 140° C. while oxygen was added incrementally until reaction was complete. Fractionation of the liquid products gave the desired epoxynitrile. Polymerization catalyst was prepared by reacting cesium fluoride, tetraglyme and hexafluoropropylene oxide tetramer under agitation for at least six hours. The reaction mixture was centrifuged for 30 minutes at 0° C. Four millimoles of the catalyst was injected into a thoroughly dried 4-neck 500 ml flask and cooled to −35° C. Hexafluoropropylene (dried by passing through molecular sieves) was added at a rate of 1 g/min for a total of 20 g. Hexafluoropropylene oxide (179 g) (dried by passing over KOH and CaH$_2$) was added at a rate of 0.07 g/min and 4.68 grams of the epoxynitrile was added at a rate of 0.13 g/h. After 47.6 hours of reaction at −33° to −35° C., the unreacted gases were removed by applying vacuum. The polymer mixture was then brought slowly to 100° C. under vacuum to remove any unreacted monomers. Quantitative infrared analysis on the acid fluoride end group indicated a number average molecular weight of approximately 40,000. The amount of incorporated epoxynitrile was 2.5% (by weight) by nitrogen analysis.

Polymer D in Table II was prepared by hydrolysis of the acid fluoride groups in polymer C to carboxyl.

Polymer E was prepared by copolymerization of perfluoro-(phenyl-2,3-epoxypropyl ether) with hexafluoropropylene oxide substantially as described in the preparation of polymer C, above. Perfluoro-(phenylallyl ether) was obtained by adding perfluoroallyl fluorosulfate rapidly to an equivalent of cesium pentafluorophenoxide in diglyme at −25°. The temperature carried to +10°, and the product was isolated by drowning the reaction mixture in water, washing the lower layer with water, and drying and distilling, bp 63° (30 mm).

A 100-ml metal tube charged with perfluoro-(phenylallyl ether) was heated at 140° while oxygen was passed in until uptake ceased. Distillation gave a mixture of perfluoro-(phenyl-2,3-epoxypropyl ether) and starting material. This distillate was stirred with CFCl$_2$CF$_2$Cl and bromine while the mixture was irradiated with a sunlamp at 40°–55° for 18 min. Distillation gave nearly pure epoxide. The several fractions were contacted with calcium hydride while open to the air until the acid fluoride impurity peak in the infrared spectrum disappeared, and were then subjected to vacuum transfer, contact with CaSO$_4$, and filtration to give purified perfluoro-(phenyl-2,3-epoxypropyl ether). 7.36 g of the perfluoro-(phenyl-2,3-epoxypropyl ether) and 138 g of hexafluoropropylene oxide were copolymerized at −32° to −35° C. over a period of 48 hours. Quantitative infrared analysis on the the acid fluoride end group indicated a number average molecular weight of approximately 25,000.

Polymer F was prepared by homopolymerization of hexafluoropropylene oxide using a monofunctional initiator. The monofunctional initiator solution was prepared by reacting 2.09 grams of effectively dried (according to procedures described in U.S. Pat. No. 3,660,315) high purity cesium fluoride with 10.1 grams of perfluorinated acid fluoride, which was an oligomer of HFPO with a number average molecular weight of 845 and an average degree of polymerization of approximately 5 (prepared according to procedures described in U.S. Pat. No. 3,412,148). The cesium fluoride and the acid fluoride were reacted in a Pyrex shaker tube containing six grams of tetraglyme which had been freshly distilled from lithium valuminum hydride. Strictly anhydrous procedures were observed throughout. The mixture was shaken for 6 hours to assure complete reaction. Excess cesium fluoride was driven to the bottom of the tube by centrifugation. The clear, liquid initiator contained approximately 4 millimoles of active cesium alkoxide per milliliter.

The polymerization vessel consisted of a fully glass jacketed four-neck round bottom reactor which is equipped with a paddle stirrer, reflux condenser cooled with solid carbon dioxide, gas inlet port and a thermocouple well. The entire reactor was dried thoroughly at 200° C. in a dry nitrogen atmosphere and was assembled and kept dry with a blanket of high purity dry nitrogen. Methanol was used as a coolant and was pumped through the coolant jacket from a Neslab ULT80 low temperature circulator and refrigerator system. With the reactor at room temperature 4 milliliters of initiator prepared as in Example 1 was introduced by means of syringe and the reactor was cooled to an internal temperature of between −30° to −34° C. Liquified hexafluoropropylene was used as a solvent to dilute the cold viscous initiator solution. The addition rate for the hexafluoropropylene was 1 gram per minute for a total of 20 grams. With slow stirring, purified hexafluoropropylene oxide purified in a two-stage (potassium hydroxide/calcium hydride) scrubber as described above was added as a gas in a semi-batch fashion at a rate of 11 milliliters per minute for a period of 20 hours. Throughout the reaction period the polymer mixture appeared as a clear and increasingly viscous liquid. Toward the end of the addition period the solution became extremely difficult to stir effectively and a further dilution with additional hexafluoropropylene was necessary. The reaction mixture was allowed to stand for approximately two hours to consume unreacted hexafluoropropylene oxide. 20 grams of hexafluoropropylene was added to the reactor at a rate of 1 gram per minute. The reaction mixture became less viscous and remained clear and could be effectively stirred. The addition of hexafluoropropylene oxide was resumed at the same rate of 11 milliliters per minute. At the end of 21 hours the reaction mixture had once again become very viscous and very difficult to stir effectively. The monomer feed was stopped and the reactor was allowed to stand for an additional three hours to assure complete reaction with residual hexafluoropropylene oxide. A vacuum was applied to the reactor to remove the hexafluoropropylene diluent at low temperature. Once most of the hexafluoropropylene was removed the reactor was slowly warmed to room temperature. The extremely viscous and frothy polymer was stirred slowly with a paddle stirrer to remove the last traces of diluent. The polymer had a tendency to climb the shaft of the reactor stirrer but would flow back down into the reactor upon further warming of the polymer. Warm polymer was removed from the reactor under anhydrous conditions to preserve the acid fluoride end group. Quantitative infrared analysis on the acid fluoride end group indicated a number average molecular weight of approximately 45,000. This polymer was neutralized with aqueous potassium hydroxide, then dried in a vacuum oven at 150° C. for three days, and finally centrifuged to remove suspended solids.

The polymer blends were compounded and cured as described in U.S. Pat. No. 4,281,092 and the results of evaluation of the surface and physical properties of the vulcanizates are described in Tables III and IV.

All parts and percentages are by weight and all temperatures are in degrees Celsius unless otherwise specified. Measurements not originally in SI units have been so converted and rounded where appropriate.

TABLE I

Tetrafluoroethylene/Perfluoro-(methylvinyl ether)/Cure-site monomer Terpolymers

| Polymer | Inh. Visc. | Composition (weight percent) | | Wt. % |
|---|---|---|---|---|
| | | PMVE | Cure-Site Monomer | |
| A | 0.70 | 45.5 | Perfluoro-(8-cyano-5-methyl-3,6-dioxa-1 octene) | 2.6 |
| B | 0.56 | 42.5 | Perfluoro-(2-phenoxypropyl vinyl-ether) | 1.9 |

TABLE II

Hexafluoropropylene oxide/Cure-site monomer Dipolymer

| Polymer | Mn × 10$^3$ | Cure-Site Monomer | Wt. % |
|---|---|---|---|
| C | 40 | Perfluoro-(6-7-epoxy-4-oxyheptane nitrile) | 2.5 |
| D | 40 | Polymer C in which end groups were hydrolyzed to carboxyl groups | 2.5 |
| E | 25 | Perfluoro-(phenyl-2,3-epoxy-propyl ether) | 3.7 |
| F | 45 | None | 0 |

TABLE III

| BLENDS OF TERPOLYMER A WITH HFPO POLYMERS | | | | |
|---|---|---|---|---|
| Example | 1 | 2 | 3 | 4 |
| Compound Recipe (parts by weight) | | | | |
| Polymer A | 69 | 75 | 90 | 80 |
| Polymer C or D | 31C | 25C | 10D | 20D |
| Tetraphenyltin | 2.9 | 3.0 | 2.9 | 3.3 |
| 18-crown-6[1] | 0.10 | 0.15 | 0.13 | 0.11 |
| SAF Black | 9.8 | 15 | 15 | 15 |
| Glass Transition Temp. (°C. by DSC[2]) | — | — | −10 | −15 |
| Molded (30 min/210° C.) and Post-Cured[3] | Dry | Dry | Dry | Dry |
| Vulcanizate Properties | | | | |
| Glass Transition Temp (°C. by DSC[2]) | −20 | −23 | −14 | −20 |
| Clash-Berg Temp. (°C.)[4] | — | −13 | −8.5 | −12 |
| Tensile Test[5] | | | | |
| Stress at 100% Elong. (MPa) | — | 6.2 | 2.5 | 2.2 |
| Stress at Break (MPa) | — | 8.7 | 10.3 | 7.1 |
| Elongation (%) | — | 120 | 190 | 170 |
| Compression Set[6] | | | | |
| #214 O-rings (%) | 32 | 22 | 43 | 46 |
| Yerzley Pellets (%) | — | 18 | 19 | 20 |
| Hardness, Shore A | 67 | 64 | 66 | 61 |

| | Non-co-curing Blend | | Control |
|---|---|---|---|
| Example | 5 | 6 | 7 |

TABLE III-continued
BLENDS OF TERPOLYMER A WITH HFPO POLYMERS

| Compound Recipe (parts by weight) | | | |
|---|---|---|---|
| Polymer A | 90A | 80A | 100A |
| Polymer F | 10F | 20F | 0 |
| Tetraphenyltin | 3.0 | 3.0 | 3.0 |
| 18-crown-6[1] | 0.20 | 0.20 | 0.10 |
| SAF Black | 15 | 15 | 15 |
| Glass Transition Temp. (°C. by DSC[2]) | −13 | −20 | −8 |
| Molded (30 min/210° C. and Post-Cured[3] | Oily surface | Oily puddles | Dry |
| Vulcanizate Properties | | | |
| Glass Transition Temp (°C. by DSC[2]) | −12 | −12, −58[7] | −8 |
| Clash-Berg Temp. (°C.)[4] | −9 | −11 | −4 |
| Tensile Test[5] | | | |
| Stress at 100% Elong. (MPa) | 2.3 | 1.8 | 5.9 |
| Stress at Break (MPa) | 6.8 | 3.5 | 10.9 |
| Elongation (%) | 210 | 190 | 140 |
| Compression Set[6] | | | |
| #214 O-rings (%) | 22 | 64 | 36 |
| Yerzley Pellets (%) | — | — | 15 |
| Hardness, Shore A | 65 | 60 | 72 |

[1]1,4,7,10,13,16-hexaoxacyclooctadecane
[2]Differential scanning calorimetry
[3]Post-cured under nitrogen - Time (hr)/Temp. (°C.)
 6/25 → 204°
 18/204°
 6/204 → 288°
 18/288°
 48/316°
[4]ASTM D-1043, 69 MPa
[5]ASTM - D412, Method A, Small Dumbbells, 25° C.
[6]ASTM - D395, 70 hr/204° C.
[7]Indicates separate phase poly HFPO

TABLE IV
BLENDS OF TERPOLYMER B WITH HFPO DIPOLYMER

| Example | 8 | 9 | Control 10 |
|---|---|---|---|
| Compound Recipe (parts by weight) | | | |
| Polymer B | 70 | 90 | 100 |
| Polymer E | 30 | 10 | 0 |
| DCH-18-crown-6[1] | 4 | 4 | 4 |
| K$_2$AF[2] | 3 | 3 | 3 |
| PbO | 4 | 4 | 4 |
| SAF Black | 10 | 10 | 10 |
| Glass Transition Temp., °C. DSC[3] | −12°, −57°[4] | −14° (−15°, −12°) | −2 |
| Molded (60 min/190° C.) and post-cured[5] | Dry | Dry | Dry |
| Vulcanizate Properties | | | |
| Glass Transition Temp. (°C.) | | | |
| By DSC[3] | −26 | −19 | −2 |
| By TMA[6] | −19 | — | — |
| Clash-Berg Temp. (°C.)[7] | −16 | −5 | +1 |
| Tensile Test[8] | | | |
| Stress at 100% Elong. (MPa) | 4.1 | 8.3 | 10.0 |
| Stress at Break (MPa) | 8.6 | 15.2 | 17.9 |
| Elongation (%) | 170 | 140 | 155 |
| Compression Set[9] | | | |
| #214 O-rings (%) | 84 | 70 | 60 |
| Yerzley Pellets (%) | 69 | 52 | 43 |
| Hardness, Shore A | 68 | 74 | 78 |

[1]Dicyclohexyl-18-crown-6
[2]Dipotassium salt of bis-phenol AF
[3]Differential scanning calorimetry
[4]Indicates separate phase poly-HFPO
[5]Post cured under nitrogen (Time hr/Temp. °C.)
 6/25 to 204°
 18/204°
 6/204 to 288°
 18/288°
[6]Thermomechanical analysis
[7]ASTM D-1043, 69 MPa
[8]ASTM D-412, Method A, Small Dumbbells, 25° C.
[9]ASTM D-395, 70 hr/204° C.

INDUSTRIAL APPLICABILITY

The fluoroelastomer blends of the present invention are useful in the manufacture of finished parts such as O-rings, flange seals, gasket stock, pump diaphragms and liners. The extraordinary physical properties and resistance to environmental attack of such parts made from these compositions make them particularly well suited for applications in process streams subject to severe fluid service at in-line temperatures as high as 700° F. or in streams carrying highly corrosive fluids, such as hydrogen sulfide.

BEST MODE

Although the best mode of the present invention, i.e., the single best fluoroelastomer blend of the present invention, will depend upon the particular desired end use and the specific requisite combination of properties for that use, the single most preferred composition of the present invention is that described in detail in Example 2.

I claim:
1. A co-vulcanizable fluoroelastomer blend consisting essentially of
   (a) 50–95 weight percent of at least one tetrafluoroethylene/perfluoro-(methylvinyl ether)/cure-site monomer terpolymer and
   (b) 5–50 weight percent of at least one hexafluoropropylene oxide/cure-site monomer dipolymer,
wherein the reactive functional group of the cure-site monomer in the terpolymer is the same as in the dipolymer and is selected from the group consisting of —C$_6$F$_5$ and —CN.
2. The blend of claim 1 wherein the terpolymer comprises 65–80 weight percent of the blend and the dipolymer comprises 20–35 weight percent.
3. The blend of claim 1 wherein the terpolymer cure-site monomer is perfluoro-(8-cyano-5-methyl-3,6-dioxa-1-octene).
4. The blend of claim 1 wherein the number average molecular weight of the dipolymer is greater than 15,000.
5. The blend of claim 1 wherein the terpolymer cure-site monomer is perfluoro-(2-phenoxypropyl vinyl ether).
6. The blend of claim 1 wherein the dipolymer cure-site monomer is perfluoro-(6,7-epoxy-4-oxaheptane nitrile).
7. The blend of claim 1 wherein the dipolymer cure-site monomer is perfluoro-(phenyl-2,3-epoxypropyl ether).
8. The blend of claim 1 wherein the terpolymer has an inherent viscosity of at least 0.4.

* * * * *